United States Patent
Arai et al.

(10) Patent No.: US 10,782,061 B2
(45) Date of Patent: Sep. 22, 2020

(54) ULTRA LOW-TEMPERATURE FREEZER

(71) Applicant: PHC HOLDINGS CORPORATION, Tokyo (JP)

(72) Inventors: Takashi Arai, Gunma (JP); Eiichi Mori, Ehime (JP)

(73) Assignee: PHC HOLDINGS CORPORATION, Tokyo (JP)

( * ) Notice: Subject to any disclaimer, the term of this patent is extended or adjusted under 35 U.S.C. 154(b) by 120 days.

(21) Appl. No.: 16/126,153

(22) Filed: Sep. 10, 2018

(65) Prior Publication Data
US 2019/0003759 A1 Jan. 3, 2019

Related U.S. Application Data

(63) Continuation of application No. PCT/JP2017/008321, filed on Mar. 2, 2017.

(30) Foreign Application Priority Data

Mar. 11, 2016 (JP) ................................ 2016-048225

(51) Int. Cl.
*F25D 11/04* (2006.01)
*F25D 23/02* (2006.01)
*F25D 23/06* (2006.01)

(52) U.S. Cl.
CPC .............. *F25D 11/04* (2013.01); *F25D 23/02* (2013.01); *F25D 23/025* (2013.01);
(Continued)

(58) Field of Classification Search
CPC ..... F25D 11/04; F25D 23/025; F25D 2201/14
See application file for complete search history.

(56) References Cited

U.S. PATENT DOCUMENTS 6,128,914 A * 10/2000 Tamaoki ................. F25B 9/006
312/401
2004/0118139 A1* 6/2004 Kelly ........................ F25B 7/00
62/199
(Continued)

FOREIGN PATENT DOCUMENTS

JP H10-300330 A 11/1998
JP 2010-096490 A 4/2010
(Continued)

OTHER PUBLICATIONS

International Search Report and Written Opinion issued in International Patent Application No. PCT/JP2017/008321 dated May 23, 2017; with partial English translation.
(Continued)

*Primary Examiner* — Elizabeth J Martin
(74) *Attorney, Agent, or Firm* — McDermott Will & Emery LLP

(57) ABSTRACT

An ultra low-temperature freezer includes: a casing that includes an exterior body having a first side surface and a second side surface laterally facing each other, an interior body, a heat insulation material, an evaporator, and a polyurethane; a hinge that includes a first hinge piece and a second hinge piece, with the first hinge piece being attached to the second side surface; and an outer door that has a third side surface and a fourth side surface facing the third side surface, with the second hinge piece being attached to the fourth side surface. The outer door includes an inner surface and an outer face provided forward of the inner surface, a heat insulation material including a vacuum heat insulation panel provided to the inner surface side, and a polyurethane provided between the heat insulation material and the outer face.

7 Claims, 7 Drawing Sheets

(52) U.S. Cl.
CPC ......... *F25D 23/028* (2013.01); *F25D 23/062* (2013.01); *F25D 2201/14* (2013.01); *F25D 2323/023* (2013.01); *F25D 2323/024* (2013.01)

(56) References Cited

U.S. PATENT DOCUMENTS

| | | | |
|---|---|---|---|
| 2010/0326109 A1 | 12/2010 | Tobe et al. | |
| 2011/0023532 A1 | 2/2011 | Kobayashi et al. | |
| 2011/0273071 A1* | 11/2011 | Kim ..................... | F25D 23/028 312/405 |
| 2012/0104922 A1 | 5/2012 | Takahashi et al. | |
| 2014/0319993 A1 | 10/2014 | Kimura et al. | |

FOREIGN PATENT DOCUMENTS

| | | | |
|---|---|---|---|
| JP | 2012-097407 | A | 5/2012 |
| JP | 2013-185735 | A | 9/2013 |
| JP | 2013-190128 | A | 9/2013 |
| WO | 2010-029839 | A1 | 3/2010 |

OTHER PUBLICATIONS

Extended European Search Report issued in corresponding European Patent Application No. 17763075.3, dated Feb. 26, 2019.

\* cited by examiner

ULTRA LOW-TEMPERATURE FREEZER

CROSS-REFERENCE OF RELATED APPLICATIONS

This application is a U.S. Continuation of International Patent Application No. PCT/JP2017/008321, filed on Mar. 2, 2017, which in turn claims the benefit of Japanese Application No. 2016-048225, filed on Mar. 11, 2016, the entire disclosures of which Applications are incorporated by reference herein.

TECHNICAL FIELD

The present disclosure relates to an ultra-low temperature freezer that includes a housing and a door mounted to the housing with hinges.

BACKGROUND ART

As a technique related to such an ultra-low temperature freezer, a freezing apparatus, for example, is described in Patent Literature (PTL) 1. This freezing apparatus includes a housing and a door that is openable by a user. The housing opens at its front side and accommodates objects. The door is mounted to the housing with a plurality of hinges. Specifically, each of the hinges has one of hinge pieces mounted to a first side of the housing and the other hinge piece mounted to a first side of the door. With regard to the door, a second side that faces the first side is provided with a handle that the user holds to open and close the door.

CITATION LIST

Patent Literature

PTL 1
Japanese Patent Application Laid-Open No. 2010-096490

SUMMARY OF INVENTION

Technical Problem

Unlike domestic or commercial refrigerators that make frequent use of center-hung hinges, an ultra-low temperature freezer has its door openably mounted to a housing by flat hinges (hereinafter simply referred to as "hinges") to realize a storage environment in an ultra-low temperature range (e.g. not more than −50° C.). With the center-hung hinges, a door rotates about shafts that are respectively inserted into bearing holes respectively formed in an upper and a lower end face of the door. On the other hand, with the hinge, a pair of hinge pieces has connecting parts that are respectively formed with bearing holes, and the hinge pieces rotate relative to each other about a pivot inserted into the bearing holes.

With the ultra-low temperature freezer, the hinge is mounted to a first side of the ultra-low temperature freezer, so that a rotation center of the door is substantially disposed on the first side of the ultra-low temperature freezer. Because of that, there is a problem that the door easily comes into contact with an object next to the first side when opened.

In view of the above problem, an object of the present disclosure is to provide an ultra-low temperature freezer that is capable of suppressing contact of a door with an object positioned next to its first side.

Solution to Problem

The present disclosure is directed to an ultra-low temperature freezer including: a housing including: an exterior body including a first side and a second side that faces the first side in a transverse direction; an interior body provided inside the exterior body, the interior body being formed with a storage space that opens in a forward direction; a thermal insulator provided between the exterior body and the interior body, the thermal insulator being formed of a vacuum insulated panel; an evaporator disposed between the exterior body and the interior body to surround the storage space; and polyurethane provided between the thermal insulator and the interior body; at least one inner door that closes an opening of the storage space when closed; a hinge including a pivot extending in a perpendicular direction, and a first hinge piece and a second hinge piece that rotate relative to each other about the pivot, the first hinge piece being mounted to the second side; and an outer door that opens and closes by rotating about the pivot, the outer door including a third side and a fourth side that faces the third side and is mounted with the second hinge piece, in which the outer door further includes: an inner face that closes the storage space when closed; an outer face provided forwardly of the inner face; a thermal insulator provided near the inner face, the thermal insulator being foiled of a vacuum insulated panel; polyurethane provided between the thermal insulator of the outer door and the outer face; and a connecting face connecting an outer-face edge that is positioned in the transverse direction and a fourth-side edge that is positioned in the forward direction with the outer-face edge that is positioned in the transverse direction being located forwardly of the fourth-side edge that is positioned in the forward direction, the connecting face being a flat surface or a recessed surface, and in which the recessed surface is formed of only points that are positioned toward the inner face from a virtual plane connecting the outer-face edge that is positioned in the transverse direction and the fourth-side edge that is positioned in the forward direction.

Advantageous Effect of Invention

According to the present disclosure, the ultra-low temperature freezer that can be provided is capable of suppressing its interference with an adjacent object.

BRIEF DESCRIPTION OF DRAWINGS

FIG. 2 is a top plan view of the ultra-low temperature freezer of FIG. 1 with a storage space seen through;

DESCRIPTION OF EMBODIMENT

1. Embodiment

With reference to the above drawings, a detailed description is hereinafter provided of ultra-low temperature freezer 1 according to an embodiment of the present disclosure.

1-1. Definition

Figure 1:
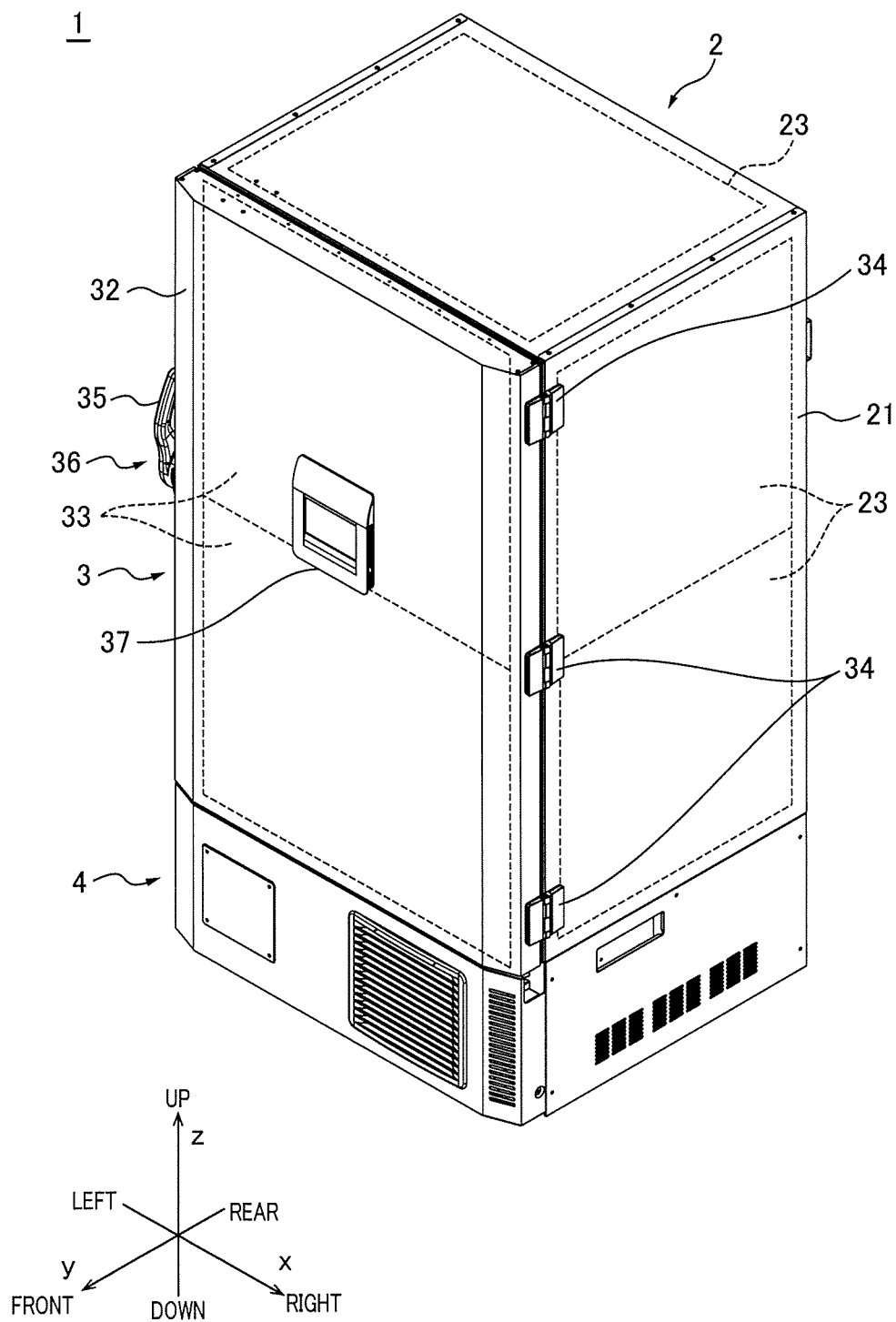
FIG. 1 is a perspective view of an ultra-low temperature freezer according to an embodiment of the present disclosure.
Figure 2:
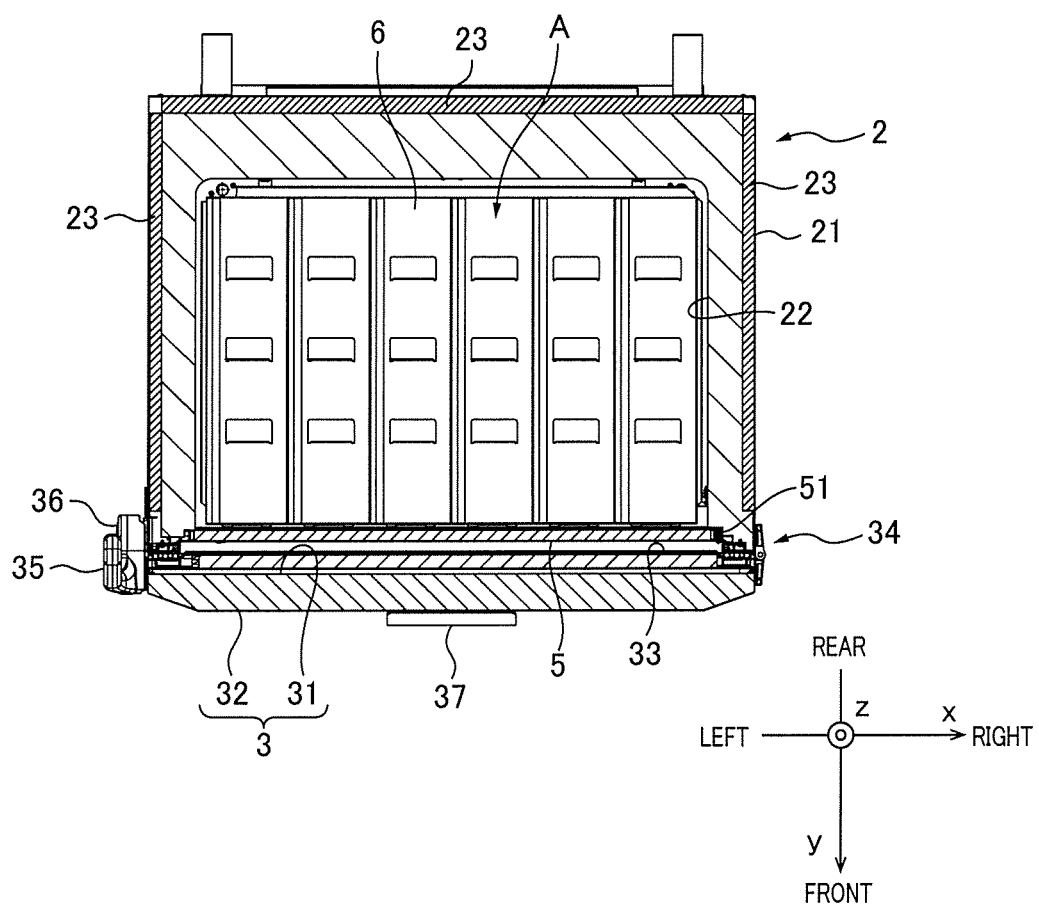

In FIGS. 1 and 2, an x-axis indicates a transverse direction of ultra-low temperature freezer 1 and more specifically, a left to right direction when a user faces ultra-low temperature freezer 1. A y-axis indicates a front-back direction of ultra-low temperature freezer 1 and more specifically, a rear to front direction (i.e. a forward direction) when the user faces ultra-low temperature freezer 1. A z-axis indicates a vertical direction of ultra-low temperature freezer 1 and more specifically, a perpendicularly upward direction from an ultra-low temperature freezer installation surface (that is substantially horizontal).

1-2. Schematic Structure of Ultra-Low Temperature Freezer 1

As illustrated in FIGS. 1 and 2, ultra-low temperature freezer 1 basically includes housing 2, outer door 3, and machinery compartment 4. It is to be noted that in FIG. 1, constituent elements that cannot be visually recognized exteriorly, such as thermal insulators 23, 33 which are described later, are indicated by broken lines.

Housing 2 generally includes exterior body 21 and interior body 22 that are made of, for example, metal, and a plurality of thermal insulators 23. Exterior body 21 defines an outside shape of housing 2. Interior body 22 is provided inside exterior body 21 and defines space (hereinafter referred to as "storage space") A for accommodating objects to store. Storage space A opens forward. Each of the plurality of thermal insulators 23 is preferably formed of a vacuum insulated panel and is provided near exterior body 21 between exterior body 21 and interior body 22. It is to be noted that FIGS. 1 and 2 do not illustrate all of the plurality of thermal insulators 23 for convenience' sake. More specifically, only those thermal insulators 23 indicated in FIG. 1 by the broken lines include thermal insulators 23 that are interposed between a right side of exterior body 21 and a right side of interior body 22 and thermal insulator 23 that is interposed between respective top sides of those bodies 21 and 22. Illustrated in FIG. 2 are thermal insulator 23 that is interposed between respective left sides of exterior body 21 and interior body 22 near exterior body 21, thermal insulator 23 that is interposed between the respective right sides of those bodies 21 and 22 near exterior body 21, and thermal insulator 23 that is interposed between respective rear sides of those bodies 21 and 22 near exterior body 21. The vacuum insulated panels respectively forming these thermal insulators 23 are indicated by leftward hatching. Formed between interior body 22 and thermal insulators 23 is a thermal insulating layer that is formed of, for example, a laminated body made of polyurethane or is obtained by filling of a thermal insulating material that foams. This thermal insulating layer is indicated by rightward hatching in FIG. 2.

Outer door 3 includes interior body 31 and exterior body 32 that are made of, for example, metal, and at least one thermal insulator 33 disposed near interior body 31 in a space between interior body 31 and exterior body 32. Outer door 3 is openable by being rotated about respective pivots 343 (described later) of, for example, three hinges 34 through user operation. When closed, outer door 3 closes an opening of storage space A. On the other hand, when outer door 3 is opened, the user can open and close inner door 5 which is described later. Thermal insulator 33 is formed of a vacuum insulated panel. It is to be noted that in FIG. 1, this at least one thermal insulator 33 is illustrated by the broken line. In FIG. 2, the vacuum insulated panel forming the thermal insulator 33 is indicated by leftward hatching. Font led between exterior body 32 and thermal insulator 33 is a thermal insulating layer that is formed of, for example, a laminated body made of polyurethane or is obtained by filling of a thermal insulating material that foams. This thermal insulating layer is indicated by rightward hatching in FIG. 2.

As described above, respective pivots 343 of hinges 34 are a rotation center of outer door 3. As such, the rotation center of outer door 3 can have reference mark 343 in the following.

Outer door 3 is also provided with handle 35 that the user holds to open and close outer door 3. In the present embodiment, handle 35 has lock mechanism 36. Lock mechanism 36 locks outer door 3 that is closed, and unlocks to allow opening of outer door 3. With outer door 3 locked by lock mechanism 36, hermeticity and thermal insulation of ultra-low temperature freezer 1 can be enhanced.

Outer door 3 is also provided with control panel 37 at its front face. Control panel 37 internally has a control circuit board (not illustrated) and has a touch panel that enables operation and visual recognition by the user. The touch panel is a device that, for example, enables the user to set a target temperature (i.e. a target value for internal temperature) of storage space A and others and displays various information items including a currently preset temperature (the target value for the internal temperature).

Machinery compartment 4 is provided, for example, below housing 2. Machinery compartment 4 houses a well-known binary refrigerating system (also called cascade cycle). It is to be noted, however, that not all elements of the binary refrigerating system are housed by machinery compartment 4. A lower-temperature-side evaporator is disposed in contact with interior body 22 between exterior body 21 and interior body 22 of housing 2 to surround storage space A for the purpose of cooling storage space A, and a cascade condenser is disposed at a rear side of storage space A. Machinery compartment 4 houses the other elements. As described above, with thermal insulators 23 of housing 2 being disposed near exterior body 21, the thermal insulating layer that is formed of, for example, the laminated body of polyurethane or is obtained by filling of the thermal insulating material that foams is formed between interior body 22 and thermal insulators 23, so that a small temperature difference can be achieved between a front surface and a rear surface of each of thermal insulators 23 (i.e. the vacuum insulated panel). Consequently, generation of cracks in the vacuum insulated panels can be suppressed. A detailed description of the binary refrigerating system is provided by PTL 1 and others and thus is not provided in the present embodiment.

Machinery compartment 4 may be internally provided with two unitary multistage refrigeration cycles that are controlled independently of each other. In this case, respective evaporators of the unitary multistage refrigeration cycles are disposed in housing 2 to surround storage space A. Even when a problem is caused to one of the unitary multistage refrigeration cycles, storage space A is maintained in an ultra-low temperature range by the other unitary multistage refrigeration cycle.

As illustrated in FIG. 2, ultra-low temperature freezer 1 preferably also includes at least one inner door 5 and at least one storage box 6.

Inner door 5 is made of, for example, resin, is mounted by at least one inner-door hinge 51 at a right edge of the opening of storage space A and rotates about a pivot that is parallel to the z-axis to be openable by the user. When closed, inner door 5 closes the opening of storage space A. On the other hand, with inner door 5 opened, the user can access storage space A. Inner door 5 such as the above can enhance a thermal insulation effect on storage space A.

Storage box 6 accommodates objects to store and is mounted on a rack (not illustrated) that is provided in storage space A. To remove the objects in storage from storage box 6, the user opens outer door 3 and inner door 5 first and then pulls storage box 6 out of storage space A.

1-3. Respective Exteriors of Housing 2 and Outer Door 3

Figure 3A:
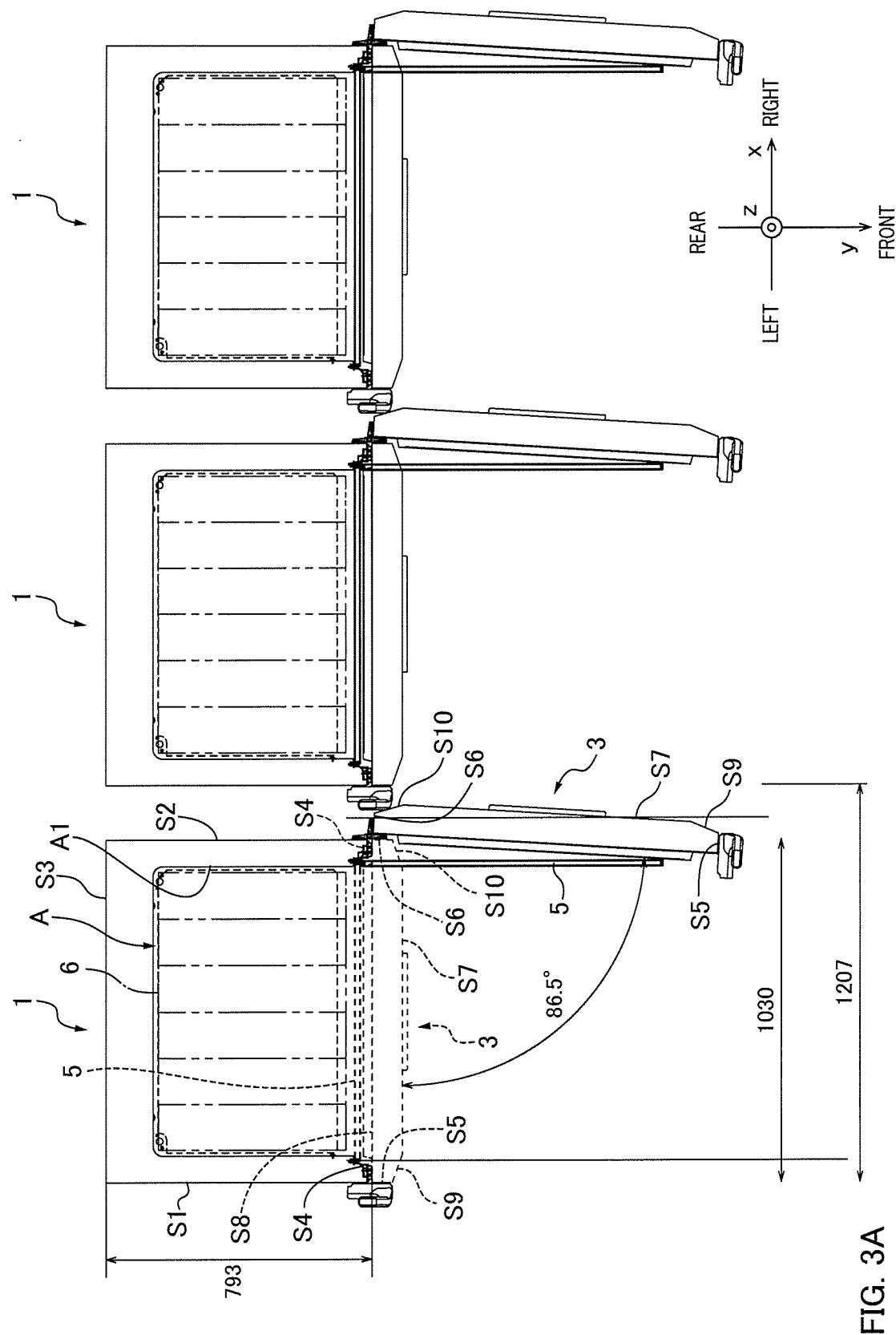
FIG. 3A illustrates, in detail, a housing and a door that are illustrated in FIG. 1.
Figure 3B:
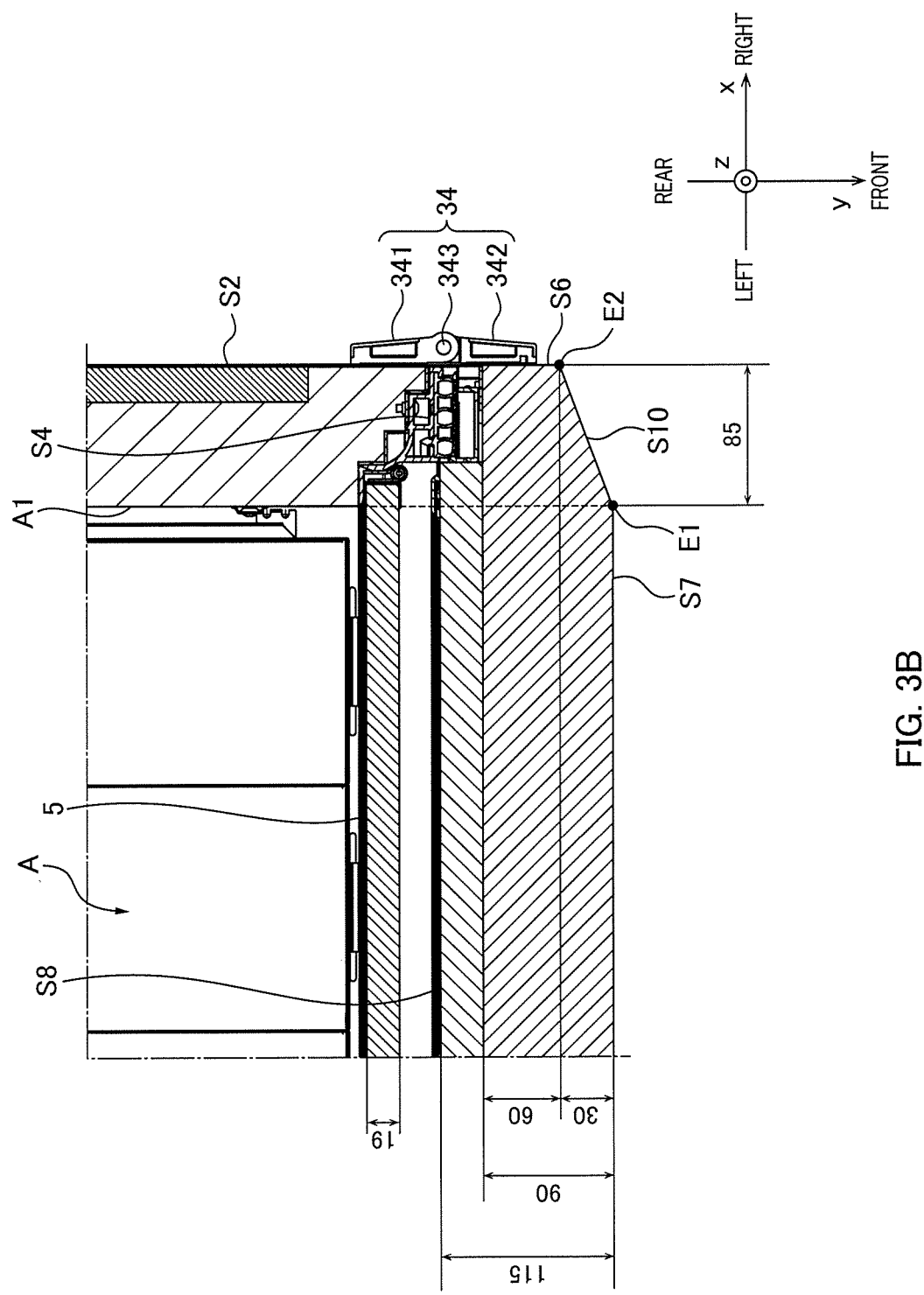
FIG. 3B is an enlarged cross-sectional view illustrating a right connecting face and its proximity that are illustrated in FIG. 3A.

As illustrated in FIGS. 3A and 3B, an exterior of housing 2 includes housing-end left side 51, housing-end right side S2, rear side S3, and housing-end peripheral edge S4. Other than these, this exterior also includes in the vertical direction a top face and a bottom face that face each other. Because of being not essential to the present disclosure, these top and bottom faces are not illustrated in FIGS. 3A and 3B.

Left side S1, which is an example of a first side, faces right side S2, which is an example of a second side, in the left to right direction, and left side S1 and right side S2 are each formed of, for example, a plane surface that is generally parallel to a y-z plane. Right side S2 faces left side S1 at a position that is about 1,030 mm away from left side S1 in the transverse direction (i.e. in the direction indicated by the x-axis) (refer to FIG. 3A).

Rear side S3 faces peripheral edge S4 in the rear to front direction, and rear side S3 and peripheral edge S4 each include, for example, a surface that is generally parallel to a z-x plane. Peripheral edge S4 faces rear side S3 in a position that is about 793 mm away from rear side S3 in the direction indicated by the y-axis (refer to FIG. 3A). This peripheral edge S4 surrounds the opening of storage space A.

As illustrated in FIGS. 3A and 3B, an exterior of outer door 3 includes door-end left side S5, door-end right side S6, front face S7, inner face S8, left connecting face S9, and right connecting face S10.

Left side S5, which is an example of a third side, faces right side S6, which is an example of a fourth side, in the left to right direction, and left side S5 and right side S6 each include, for example, a surface that is generally parallel to the y-z plane. Right side S6 faces left side S5 at a position that is about 1,030 mm away from left side S5 in the direction indicated by the x-axis (refer to FIG. 3A). Left side S5 and right side S6 head forward (i.e. in the direction indicated by the y-axis), respectively starting from a left edge and a right edge of inner face S8 which is described later. It is to be noted here that left side S5 and right side S6 each have a y-axis length of, for example, about 60 mm (refer to FIG. 3B).

Front face S7 and inner face S8 face each other and each include, for example, a surface that is generally parallel to the z-x plane. Inner face S8 faces outer face S7 at a position that is at most about 115 mm away from outer face S7 in a rearward direction (i.e. in the direction opposite to the direction indicated by the y-axis). A y-axis distance between each of x-axis ends of a peripheral edge of inner face S8 and outer face S7 is about b 90 mm (refer to FIG. 3B). With outer door 3 closed, above-mentioned housing-end peripheral edge S4 faces the peripheral part of inner face S8 in the direction indicated by the y-axis.

It is preferable that housing-end peripheral edge S4 (mentioned above) and the peripheral edge of inner face S8 be respectively mounted with breakers that are made of, for example, resin. Either one of peripheral edge S4 and inner face S8 is mounted with packing or the like via the breaker. When outer door 3 is closed and is locked by lock mechanism 36 (described later), inner face S8 faces housing-end peripheral edge S4 in close proximity to housing-end peripheral edge S4, thereby crushing the packing and the breakers that are interposed between inner face S8 and peripheral edge S4.

Left connecting face S9 includes a flat surface that connects a left edge of outer face S7 and a front edge of left side S5. Right connecting face S10 includes a flat surface that connects right edge E1 of outer face S7 and front edge E2 of right side S6. In right connecting face S10 such as the above, right edge E1 of outer face S7 is provided forwardly of front edge E2 of right side S6. This right connecting face S10 is parallel to pivots 343 and defines a straight line in a plane viewed in the direction indicated by the z-axis. In other words, right connecting face S10 has substantially identical cross-sectional shapes when outer door 3 is cut along x-y planes at z-axis positions of choice.

Right connecting face S10 is preferably formed between right side S6 and right edge A1 of storage space A in a plane view taken along the y-axis.

In consideration of design quality of ultra-low temperature freezer 1, outer door 3 is preferably shaped to have a bilateral symmetry. In other words, connecting faces S9, S10 are preferably shaped to be symmetrical to each other about a longitudinal plane of symmetry of ultra-low temperature freezer 1. The longitudinal plane of symmetry passes through an x-axis center of ultra-low temperature freezer 1 and is parallel to the y-z plane.

As illustrated clearly in FIG. 3B, each of hinges 34 has first hinge piece 341, second hinge piece 342, and pivot 343 that extends perpendicularly (in the direction indicated by the z-axis). Hinge pieces 341, 342 both have bearing holes respectively formed in their connecting parts. Hinge pieces 341, 342 rotate relative to each other about pivot 343 that is inserted into the bearing holes. In the present embodiment, for realization of a storage environment in the ultra-low temperature range, outer door 3 is openably mounted to housing 2 by use of three hinges 34 each having the structure such as the above (refer to FIG. 1). More specifically, first hinge pieces 341 are respectively fixed to three locations on housing-end right side S2 by screws or others, while second hinge pieces 342 are respectively fixed to three locations on door-end right side S6. As such, right side S6 is designed to have its y-axis length in consideration of respective y-axis lengths of second hinge pieces 342.

1-4. Functional Effects of Ultra-Low Temperature Freezer 1

With a conventional freezing apparatus (i.e. a freezing apparatus of PTL 1), a plurality of hinges are mounted to a housing-end right side, so that a door is openable relative to a housing. As such, a rotation center of the door is substantially disposed on a right side of the freezing apparatus. Moreover, a right front corner of the door (that is to say, a corner formed by an outer face and a side of the door) is substantially right-angled. Because of that, in cases where the freezing apparatus is installed with its right side positioned alongside a wall, the corner of the door easily comes into contact with the wall when the door is opened.

On the other hand, with ultra-low temperature freezer 1, the housing and the door respectively have suppressed thicknesses without affecting thermal insulation performance because of the vacuum insulated panels provided as the thermal insulators, and a right front corner of the door has the flat surface (i.e. right connecting face S10) that connects right edge E1 of outer face S7 and front edge E2 of right side S6. A y-axis distance from rotation center 343 of outer door 3 to a rear edge of right connecting face S10 (i.e. front edge E2 of right side S6) is smaller than a y-axis distance from rotation center 343 to a front edge of right connecting face S10 (i.e. right edge E1 of outer face S7) (refer to FIG. 3B). Thus, outer door 3 does not easily come into contact with a wall even when ultra-low temperature freezer 1 is installed with its right side positioned alongside the wall.

Figure 4:
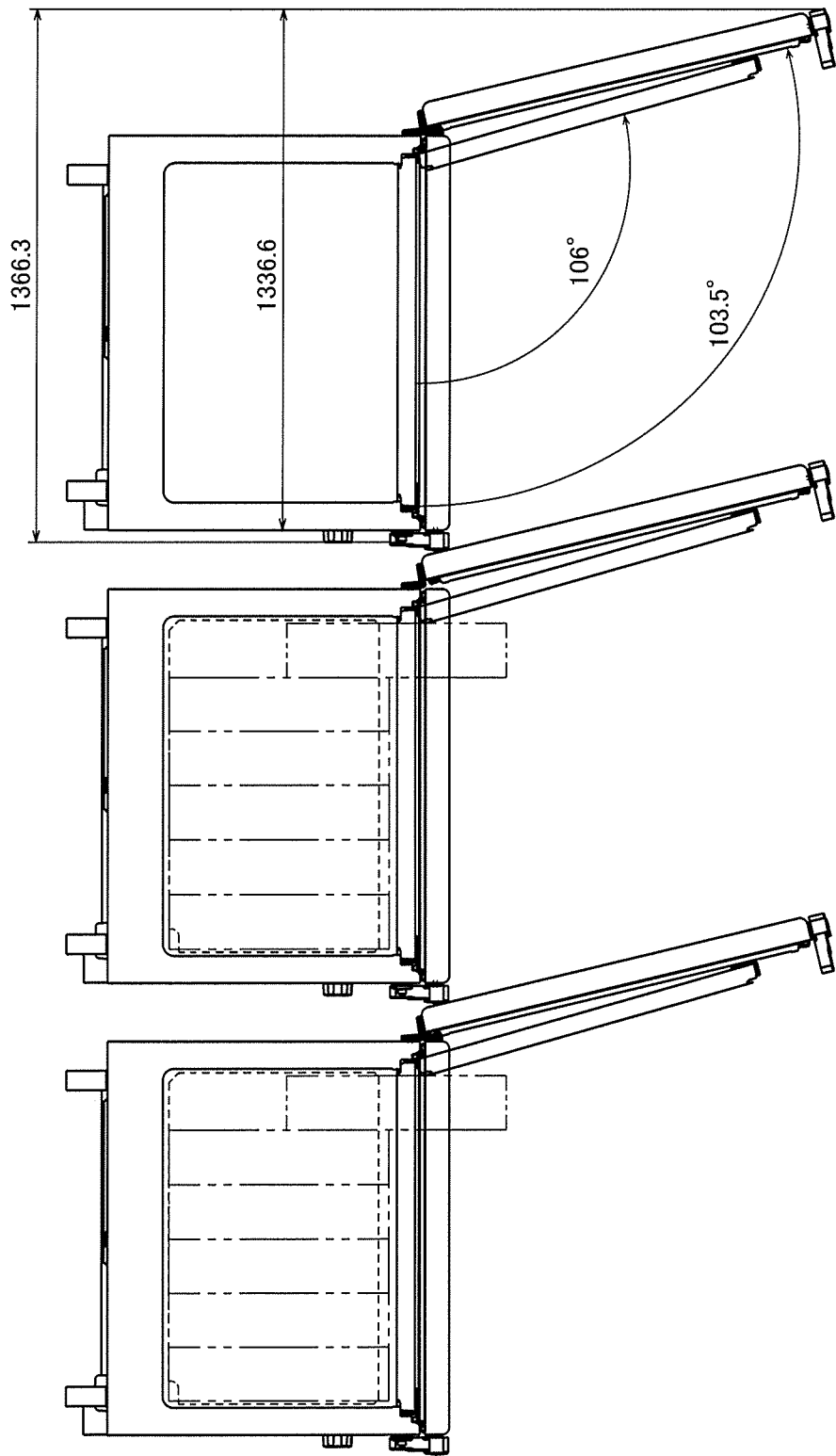
FIG. 4 illustrates an ultra-low temperature freezer according to a comparative example.

Since outer door 3 does not easily come into contact with the wall, this ultra-low temperature freezer 1 can have an increased y-axis distance between inner face S8 and outer face S7. For this reason, ultra-low temperature freezer 1 can secure the requisite thermal insulation performance even if inner door 5 is made thinner. With outer face S7 of outer door 3 shifted forward and with inner door 5 being thinner, the user can take storage box 6 out of storage space A with more ease. This is because a smaller rotation amount of outer door 3 (i.e. a smaller outer-door open angle) is required for 90° rotation of inner door 5 from a closed position. In the case of ultra-low temperature freezer 1, as illustrated in FIGS. 3A and 3B, when the thickness of outer door 3 is about 90 mm with inner door 5 having a thickness of about 19 mm, 86.5° rotation of outer door 3 allows inner door 5 to open 90°. This allows storage box 6 to be taken out of storage space A. It is to be noted that here ultra-low temperature freezer 1 takes up an x-axis space of 1,209 mm at most. On the other hand, in cases where an outer door is thinner with an inner door being thicker as in an ultra-low temperature freezer according to a comparative example, the outer door has to be rotated 103.5° for 106° opening of the inner door, or else a storage box cannot be taken out (refer to FIG. 4). It is to be noted that here the ultra-low temperature freezer of the comparative example takes up an x-axis space of 1,366.3 mm at most.

In cases where outer door 3 can be made thicker as in ultra-low temperature freezer 1, the vacuum insulated panel that forms thermal insulator 33 can be disposed in contiguity with inner face S8. In other words, thermal insulator 33 can be isolated from control panel 37 that is provided at outer face S7 of outer door 3. Accordingly, there is no need for shaping of thermal insulator 33 based on an electrical system inside outer door 3 or designing of an electrical system that avoids thermal insulator 33. Consequently, thermal insulator 33 can be disposed in outer door 3 at low costs.

By being disposed near inner face S8, thermal insulator 33 is also isolated from outer face S7. In this case, a front surface of thermal insulator 33 is less susceptible to ambient temperature, and the lower-temperature-side evaporator is not disposed in outer door 3. As such, a small temperature difference can be achieved between the front surface and a rear surface of thermal insulator 33 (i.e. the vacuum insulated panel). Consequently, generation of cracks in the vacuum insulated panel can be suppressed.

Since thermal insulator 33 can be disposed in contiguity with inner face S8, an x-axis length of thermal insulator 33 to dispose can be greater than an x-axis length of outer face S7 as illustrated in FIG. 3B. Accordingly, ultra-low temperature freezer 1 can have its thermal insulation performance improved.

As illustrated in FIG. 3B, right connecting face S10 is preferably formed between right side S6 and right edge A1 in the plane view taken along the y-axis. Right connecting face S10 has an x-axis length of, for example, about 85 mm. In this way, a spatial distance between right connecting face S10 that is inclined to the x-axis and storage space A can be prevented from being too small. This means that a thermal conduction path between storage space A and an exterior of ultra-low temperature freezer 1 can be prevented from being shorter, so that degradation of the thermal insulation performance can be suppressed.

2. First Modification

Figure 5:
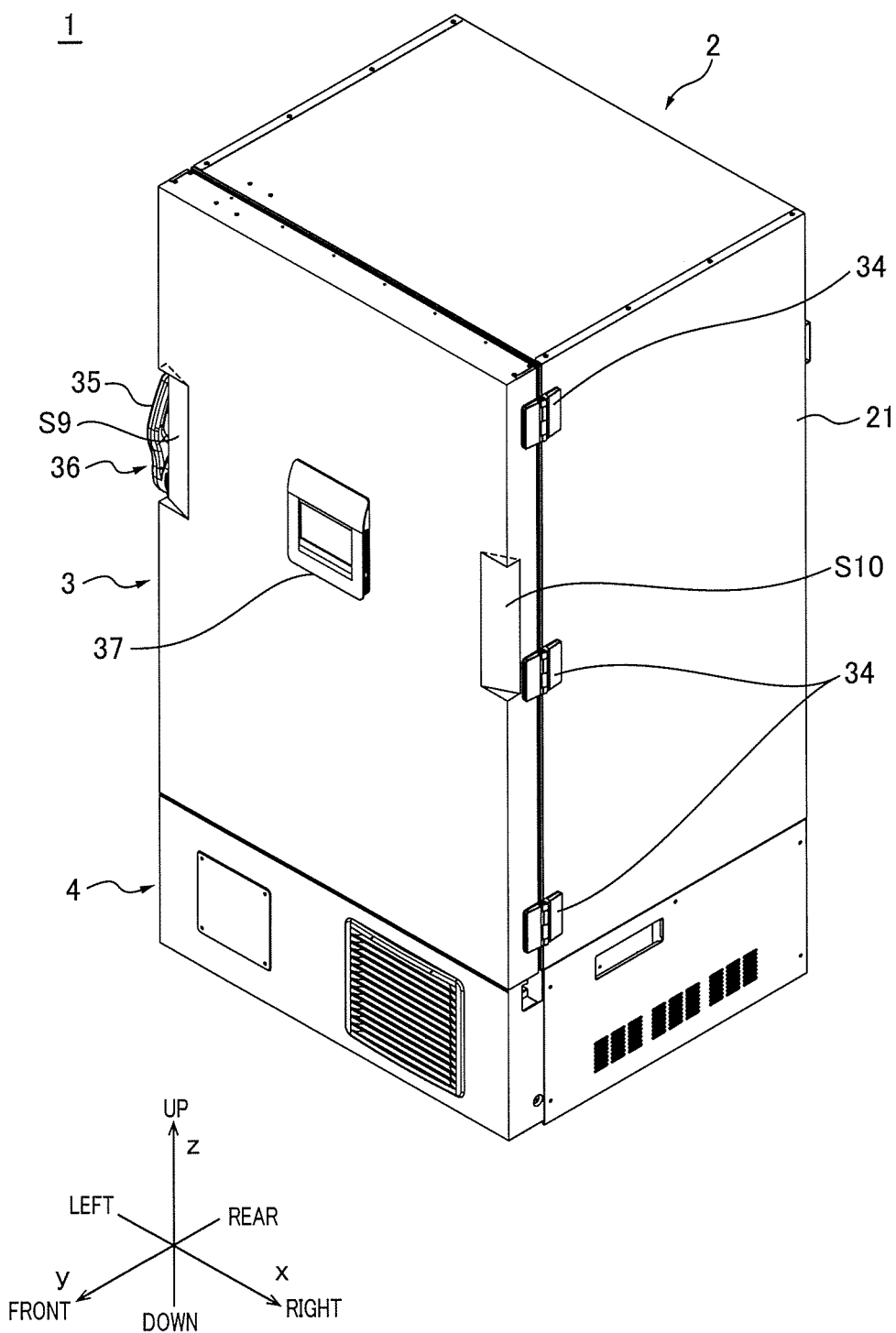
FIG. 5 is a perspective view of an ultra-low temperature freezer according to a first modification.

With reference to FIG. 5, a description is provided next of ultra-low temperature freezer 1 according to a first modification of the above embodiment.

2-1. Structure in First Modification

In the above embodiment, right connecting face S10 is provided to cover an area from an upper edge to a lower edge of outer door 3. However, right connecting face S10 is not limited to this. As illustrated in FIG. 5, right connecting face S10 may be provided to cover a part of the area from the upper edge to the lower edge of outer door 3.

In this case, respective positions of an upper and a lower edge of right connecting face S10 are fixed in consideration of a location where a handle and a lock mechanism of an ultra-low temperature freezer of the same model or a different model (hereinafter referred to as "another ultra-low temperature freezer") are disposed (i.e. in consideration of respective positions of an upper and a lower edge of that location in the perpendicular direction). More specifically, right connecting face S10 is preferably designed so that its upper edge and its lower edge are substantially aligned with the respective upper and lower edges of the location where the handle and the lock mechanism of the other ultra-low temperature freezer are disposed. In this case, it is to be noted that outer face S7 and right side S6 meet, for example, substantially at right angles in an area other than right connecting face S10.

Figure 6:
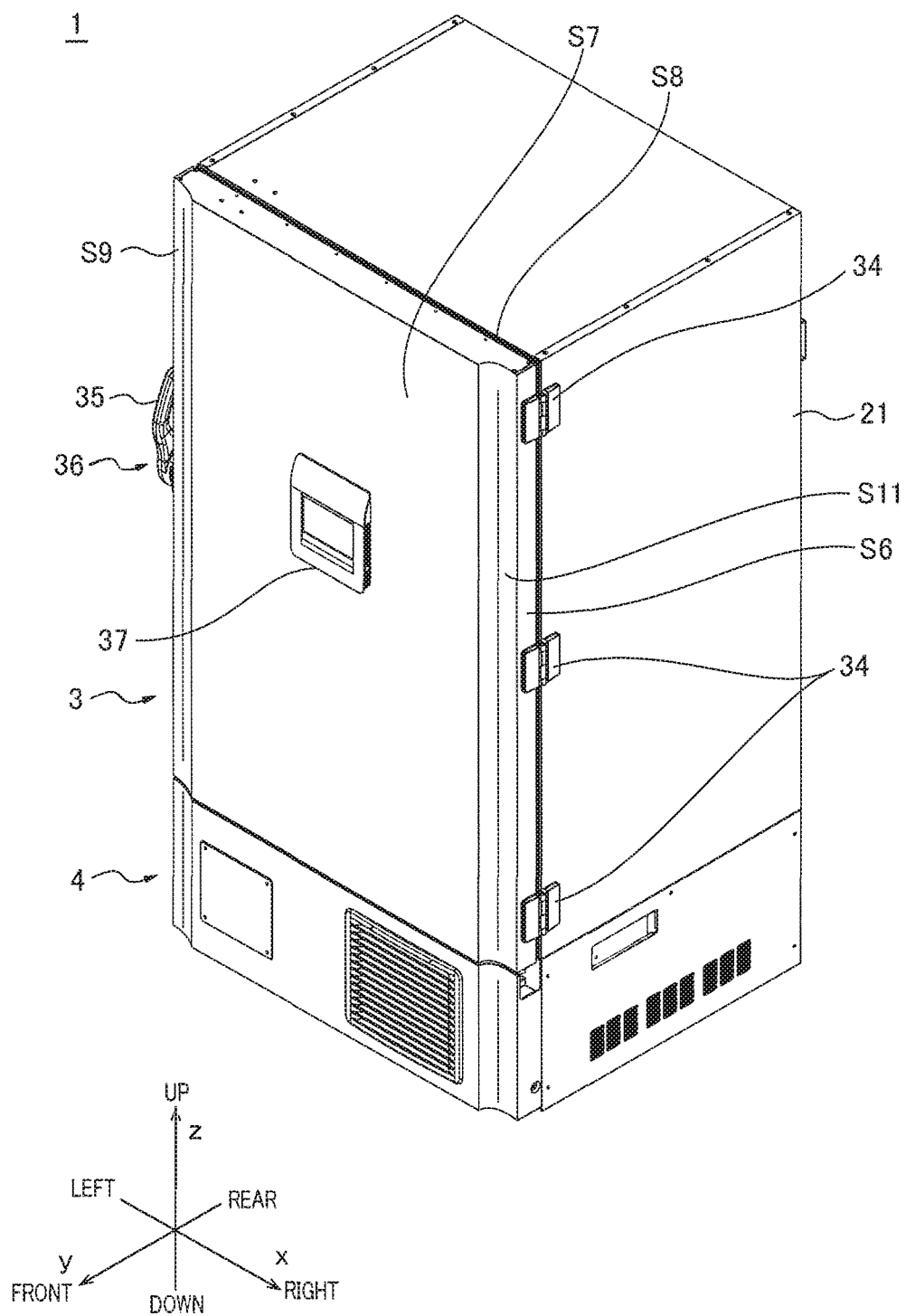
FIG. 6 is a perspective view of an ultra-low temperature freezer according to a second modification.

In addition, left connecting face S9 is preferably shaped to be symmetrical to right connecting face S10 of FIG. 6 about the above-mentioned longitudinal plane of symmetry.

2-2. Effects of First Modification

According to the first modification, in cases where ultra-low temperature freezer 1 and the other ultra-low temperature freezer are disposed side by side, because of right connecting face S10 provided, outer door 3 of ultra-low temperature freezer 1 does not easily come into contact with the handle or the lock mechanism of the other ultra-low temperature freezer when opened.

An ultra-low temperature freezer is generally used in a research institution. As such, unlike domestic refrigerators and others, a plurality of ultra-low temperature freezers are sometimes disposed side by side in the same indoor space. When replacing one of those freezers with another ultra-low temperature freezer, generally, many users would conceivably not want to move the other ultra-low temperature freezers. In this case, an installation space for the ultra-low temperature freezer is limited. However, ultra-low temperature freezer 1 is suitable for side-by-side installation as described above and thus is very advantageous even during replacement such as the above.

3. Second Modification

With reference to FIG. 6, a description is provided next of ultra-low temperature freezer 1 according to a second modification of the above embodiment.

3-1. Structure in Second Modification

In the above embodiment, right connecting face S10 is flat. However, as illustrated in FIG. 6, right connecting face S11 may be a recessed surface instead. In a plane viewed in the direction indicated by the z-axis, this recessed surface is a set of only points that are positioned toward inner face S8 from a virtual plane connecting a right edge of outer face S7 and a front edge of right side S6. It is to be noted that the recessed surface may be a curved surface or a set of a plurality of flat surfaces.

In addition, left connecting face S9 is preferably shaped to be symmetrical to right connecting face S11 of FIG. 6 about the above-mentioned longitudinal plane of symmetry.

3-3. Effects of Second Modification

Even with the second modification, functional effects that are similar to the functional effects described in section 1-4 are achieved.

4. Additional Remarks

It is to be noted that respective ultra-low temperature freezers 1 of the above embodiment and the modifications may be flipped horizontally.

In consideration of design quality of each of ultra-low temperature freezers 1, in a plane viewed in the direction indicated by the z-axis, a left front corner and a right front corner of machinery compartment 4 may be formed into shapes that are substantially identical to left connecting face S9 and right connecting face S10, respectively. A front face of machinery compartment 4 can be provided with an air inlet for the binary refrigerating system, so that at least one of left connecting face S9 or right connecting face S10 is preferably shaped in consideration of size of the air inlet.

The present application claims priority to Japanese Patent Application No. 2016-048225 filed with the Japan Patent Office on Mar. 11, 2016. The contents of Japanese Patent Application No. 2016-048225 are hereby incorporated by reference into the present application.

INDUSTRIAL APPLICABILITY

An ultra-low temperature freezer according to the present disclosure can quickly regain temperature of a storage space and thus is suitable as an ultra-low temperature freezer or the like.

REFERENCE SIGNS LIST

1 Ultra-low temperature freezer
2 Housing
S1 Housing-end left side
S2 Housing-end right side
S3 Rear side
S4 Housing-end peripheral edge
A Storage space
3 Outer door
S5 Door-end left side
S6 Door-end right side
S7 Outer face
S8 Inner face
S9 Left connecting face
S10 Right connecting face
34 Hinge
341 First hinge piece
342 Second hinge piece
343 Pivot

The invention claimed is:

1. An ultra-low temperature freezer comprising:
   a housing including:
      an exterior body including a first side and a second side that faces the first side in a transverse direction;
      an interior body provided inside the exterior body, the interior body being formed with a storage space that opens in a forward direction;
      a thermal insulator provided between the exterior body and the interior body, the thermal insulator being formed of a vacuum insulated panel;
      polyurethane provided between the thermal insulator and the interior body;
   at least one inner door that closes an opening of the storage space when closed;
   an outer door that opens and closes by rotating about a pivot axis, the outer door including a third side and a fourth side that faces the third side;
   a hinge including a pivot arranged in line with the pivot axis, and a first hinge piece, and a second hinge piece, the first hinge piece being mounted on the second side of the exterior body, the second hinge piece being mounted on the fourth side of the outer door; and
   wherein the outer door further includes:
      an inner face that closes the storage space when closed;
      an outer face provided forwardly of the inner face;
      a thermal insulator provided near the inner face, the thermal insulator being formed of a vacuum insulated panel; and
      polyurethane provided between the thermal insulator of the outer door and the outer face,
      the third and fourth faces being disposed between the inner face and the outer face,
      the outer face having a first edge on a side of the fourth side,
      the fourth side having a second edge on a side of the outer face,
      the outer door further having a connecting face disposed between the first edge and the second edge,
      a distance between the inner face and the first edge of the outer face in the forward direction being greater than a distance between the inner face and the second edge of the fourth side in the forward direction, and
      a distance between the third side and the first edge of the outer face in the transverse direction being less than a distance between the third side and the second edge of the forth side in the transverse direction.

2. The ultra-low temperature freezer according to claim 1, wherein the vacuum insulated panel disposed for the outer door has a greater transverse length than the outer face of the outer door in a plane view taken in the forward direction.

3. The ultra-low temperature freezer according to claim 1, wherein the first edge of the face is aligned with a third edge of the storage space on a side of the second side of exterior body, in a plane view taken in the forward direction.

4. The ultra-low temperature freezer according to claim 1, wherein the connecting face covers an area from an upper edge to a lower edge of the outer door in the perpendicular direction.

5. The ultra-low temperature freezer according to claim 1, further comprising:
- a handle that is held by a user when the outer door is opened and closed, the handle being mounted to the third side; and
- a lock mechanism that secures the outer door to the housing when the outer door is closed, the lock mechanism being mounted to the first side and the third side,
- wherein the connecting face covers a part of an area from an upper edge to a lower edge of the outer door in the perpendicular direction, and
- wherein the part of the area is fixed based on a perpendicular location of the handle.

6. The ultra-low temperature freezer according to claim 1, wherein the connecting face is a flat surface.

7. The ultra-low temperature freezer according to claim 1, wherein
- the connecting face is a recessed surface, and
- the recessed surface is formed of only points that are positioned toward the inner face from a virtual plane connecting the first edge of the outer face and the second edge of the fourth side.

* * * * *